Figure 1:
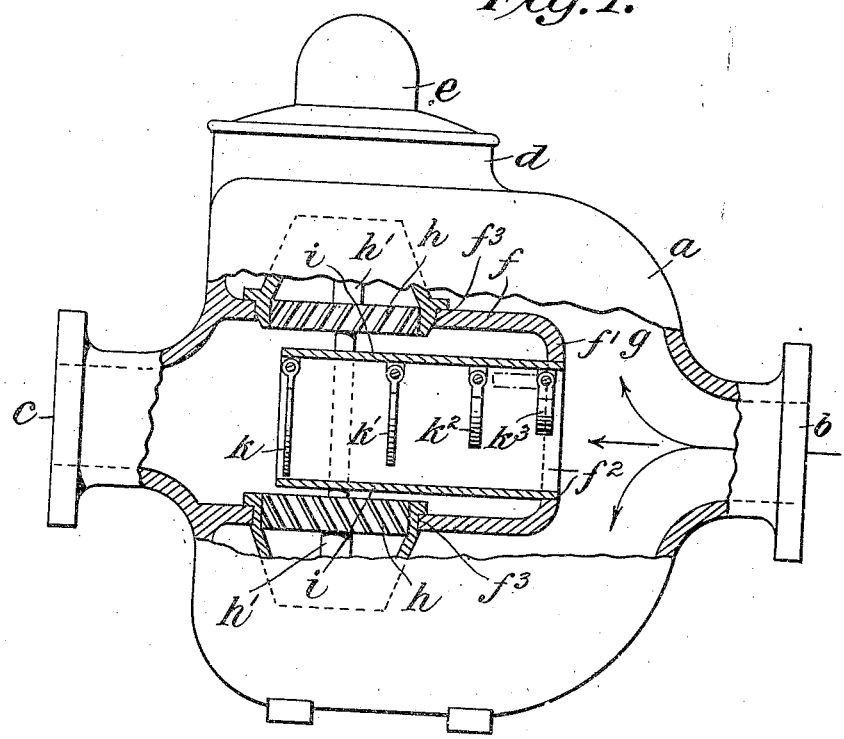

J. M. BURTON.
WATER METER.
APPLICATION FILED APR. 6, 1912.

1,037,431.

Patented Sept. 3, 1912.

Attest:

Inventor:
James M. Burton
by Redding & Greeley, Attys.

UNITED STATES PATENT OFFICE.

JAMES M. BURTON, OF LONG ISLAND CITY, NEW YORK, ASSIGNOR TO NEPTUNE METER COMPANY, OF NEW YORK, N. Y., A CORPORATION OF NEW JERSEY.

WATER-METER.

1,037,431.     Specification of Letters Patent.     Patented Sept. 3, 1912.

Application filed April 6, 1912. Serial No. 688,900.

*To all whom it may concern:*

Be it known that I, JAMES M. BURTON, a citizen of the United States, residing in Long Island City, Queens county, State of New York, have invented certain new and useful Improvements in Water-Meters, of which the following is a specification, reference being had to the accompanying drawing, which forms a part hereof.

This invention relates particularly to water meters of the general type of that described in an application for Letters Patent of the United States, filed by this inventor, Serial No. 589,113, dated October 26, 1910, and intended particularly for use on factory lines, etc., through which the ordinary flow is moderate while the extraordinary flow, in case of fire, is very large. In order that the meter intended for such use may meet the requirements of the fire underwriters it is necessary that the flow through the meter under extraordinary conditions shall be as direct and free from obstruction as possible. This necessitates the use of a proportional meter with its turbine wheels out of the path of the direct flow from inlet to outlet of the meter casing and the diversion of a portion of the flow through such wheels. With all parts properly proportioned it has been found that under some conditions of flow reasonably accurate registration by the proportional meter wheels can be obtained even when the main flow aperture through the meter is directly in line with the inlet and outlet, has substantially the same area as the inlet and the outlet and is wholly unobstructed. The complete absence of obstruction is a very desirable feature from the standpoint of the fire underwriter, since there is no opportunity for the clogging of the flow by the lodging of foreign bodies within the meter casing and because the loss of head is a minimum. There is some loss of head due to friction which is relied upon to effect the diversion of a sufficient portion of the flow to operate the meter wheels, but when the flow is very small the portion diverted is insufficient to operate the meter wheels and there may be therefore some flow without registration, which is undesirable from the standpoint of the water purveyor.

The principal object of this invention is to create a sufficient resistance to the direct flow through the meter to divert a sufficient portion of the flow through the meter wheels not only to operate them but to cause them to operate with substantial accuracy, even at low rates of flow, and to accomplish this result without obstructing the direct flow to such a degree or occasioning such loss of head as to lose the approval of the fire underwriters.

In accordance with the invention there is provided within the casing and between the inlet and the outlet a transverse wall which has a main flow aperture in direct line with the inlet and the outlet and of substantially the same area in cross section and there is also provided, in the path of direct flow and preferably in a sleeve-like extension from said aperture and of the same internal diameter, a freely movable hinged flap valve which offers sufficient resistance to divert enough of the flow through the meter wheels to operate them, even at low rates of flow, but does not cause material loss of head at high rates of flow and does not offer such obstruction as to render likely the lodgment of foreign bodies. With a single flap valve interposed in the path of direct flow through a meter of this description fairly satisfactory results are secured, but it is found that in the operation of such a meter a single flap valve of this description oscillates or vibrates more or less and causes sudden changes in the rate of flow through the meter wheels so that they are not operated steadily and the meter consequently fails to register accurately. It has been found also that these vibrations can be reduced and their evil effect practically eliminated by the employment of two or more such flap valves at different points in the direct flow and preferably within the sleeve extension referred to. The spacing apart of such valves insures a difference in phase of their vibrations so that even if both or all the valves vibrate one negatives the effect of the other or others. Furthermore, the provision of two or more such flap valves permits the required total resistance to be distributed at different points and divided between the several valves, so that no one of the valves is required to be as heavy as would be the case if only one valve were employed and further permits valves of different areas to be employed, so that at very low flows only one of the valves is swung from its normal position, the one valve having sufficient resistance to produce the desired result under such conditions, while at higher rates of flow two or more of the valves in succession are swung from their normal position, such valves offering a resistance which is increased thereby increasing the resistance somewhat in proportion to the increase in the flow and thereby maintaining, with an increasing rate of flow, a diversion of flow through the meter wheels in the same proportion to the direct flow, so that the registration effected by the operation of the meter wheels is accurate not only for low flow and for maximum flow, but is practically accurate for all rates of flow between the extremes. It is true that there may be a flow at such a very low rate that there will be no operation of the meter wheels and consequently no registration, but by this invention accurate operation of the meter wheels is accomplished at lower rates of flow than has been possible hitherto in the use of proportional meters.

The invention will be more fully explained hereinafter with reference to the accompanying drawing in which it is illustrated and in which—

Figure 2:
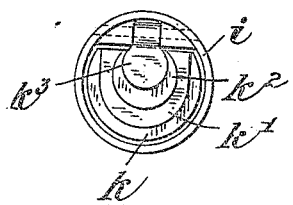

Figure 1 is a view partly in side elevation and partly in longitudinal section of a meter which embodies the invention. Fig. 2 is a detail view in end elevation of the extension sleeve and resistance devices carried thereby.

The meter to which the invention is applied may be of any suitable character and as shown in the drawing may have a shell or casing $a$ of any usual or suitable form, provided with an inlet $b$ and an outlet $c$ and provided also with a cap $d$ which supports the usual registering mechanism, sufficiently indicated by its casing $e$. Within the shell or casing $a$ is a wall $f$ extended from the shell or casing $a$ near its outlet end and having in its end wall $f'$, which is substantially transverse with respect to the direction of flow, an aperture $f^2$ which is in direct line with the inlet and the outlet and has an area in cross section substantially equal to the area in cross section of the inlet and of the outlet. Between the chamber wall $f$ and the casing $a$ is an ample passage $g$ which offers to the inflowing water an additional path of such area as to permit a sufficient flow to operate the proportional meter and in one or each of the opposite walls of the inner casing or chamber wall $f$ is an opening $f^3$ in which is placed an ordinary meter turbine $h$, mounted upon a shaft $i$ and connected in the usual manner with the registering mechanism at $e$.

It has been found that with such a construction as that already described, by reason of the provision of a path $g$ of relatively large area, a sufficient portion of the water, even at rather low rates of flow, will flow through such passage $g$ to operate the metering devices, under ordinary conditions. In order, however, that a sufficient portion of the flow may be diverted through the passage $g$ and the turbine wheel or wheels $h$ to operate the metering devices at very low rates of flow it is desirable to interpose in the direct flow from inlet to outlet a resistance of such a character as to insure such diversion or flow and as not to obstruct the direct flow so as to afford lodgment for foreign bodies or to reduce the head appreciably under fire service or high-duty conditions. Accordingly there is hung in the path of direct flow a light flap valve $k$, preferably supported by a sleeve $i$ which is extended from the aperture $f^2$ toward the outlet and in line therewith. Such light flap valve offers sufficient resistance at low flows to cause a diversion through the passage $g$ of a sufficient proportion of the total flow to operate the proportional metering devices, and at the same time it is not heavy enough to offer appreciable resistance to a large flow. Furthermore, it does not offer opportunity for the lodgment of foreign bodies which may enter the meter. With a single flap valve, such as that described, fairly accurate registration is secured at low flows, and of course fairly accurate registration is also secured at great flows when the proportion of water which flows through the meter wheels approaches the maximum, the resistance offered by the single valve under such conditions being negligible. It is found, however, that for intermediate flows extreme accuracy cannot be approached as closely with a single valve as with a plurality of such valves located at different points, for the reason that the effect of vibrations of a single valve, which interfere with the accuracy of registration, is overcome with a plurality of such valves the vibrations of which are not in phase. Accordingly, the sleeve $i$ is preferably made sufficiently long, as shown in the drawing, to support several valves as $k$, $k'$, $k^2$ and $k^3$, so that the pulsations in the stream which may be produced by the vibrations of one valve are not in phase with the pulsations produced by the vibrations of another valve and a steadier flow through the metering devices results. Furthermore if a given resistance is desirable for ordinary low flows, the distribution of such resistance between different points and among different valves of lighter weight individually, so that for the lowest rate of flow only one valve shall be operative while for other rates of flow the remaining valves are successively brought into operation, permits the diversion of a sufficient portion of the total flow to operate the metering devices at a lower rate of flow than would be possible if a single heavier valve were employed. Furthermore, the employment of a plurality of resistance valves permits difference in area of the valves to be taken advantage of without substantial difference in weight, the valves $k$, $k'$, $k^2$ and $k^3$ being successively smaller in area toward the inlet but thicker so that the weights remain substantially the same. Thus, at the lowest rate of flow the valve $k$ alone may be swung from normal position, the flow passing under the valves ahead of it without disturbing them, while at greater rates of flow one or more of the valves ahead of it are also swung from normal position. It will be noted that while each valve offers less resistance when swung to a horizontal position than when hanging in a vertical position, the remaining valves, which still remain in a vertical position, offer the required resistance to the increased flow. Preferably the several valves are so placed that each one may swing to a horizontal position, in the direction of flow, without making contact with the next valve behind it.

It will be obvious not only that the shape of the outer casing $a$ and the shape of the inner casing $f$ and the arrangement of the metering devices may be changed to suit different conditions of use, but that the number and the shape and weight of the resistance valves will also be changed to suit different requirements.

I claim as my invention:—

1. In a proportional meter, the combination of a meter shell having an inlet at one end and an outlet at the other end, a wall between the inlet and the outlet having a main flow aperture of substantially the same area as the inlet and the outlet and having also a measuring aperture, a free passage from the inlet to the measuring aperture being provided within the shell, a measuring wheel located in the measuring aperture, a sleeve extended from the main flow aperture toward the outlet, and a plurality of resistance valves hung in said sleeve.

2. In a proportional meter, the combination of a meter shell having an inlet at one end and an outlet at the other end, a wall between the inlet and the outlet having a main flow aperture of substantially the same area as the inlet and the outlet and having also a measuring aperture being provided within the shell, a measuring wheel located in the measuring aperture, a sleeve extended from the main flow aperture toward the outlet, and a plurality of resistance valves hung in said sleeve, said resistance valves being of different areas.

3. In a proportional meter, the combination of a meter shell having an inlet at one end and an outlet at the other end, a wall provided within the shell between the inlet and the outlet having a main flow aperture of substantially the same area as the inlet and the outlet and having also a measuring aperture, a measuring wheel located in the measuring aperture, a sleeve extended from the main flow aperture toward the outlet, and a plurality of resistance valves hung in said sleeve, said resistance valves being of different areas and of substantially equal weights.

This specification signed and witnessed this 3rd day of April A. D., 1912.

JAMES M. BURTON.

Witnesses:
  E. M. TAYLOR,
  WORTHINGTON CAMPBELL.